United States Patent [19]
Yanagida

[11] Patent Number: 6,023,342
[45] Date of Patent: *Feb. 8, 2000

[54] IMAGE PROCESSING DEVICE WHICH TRANSFERS SCANNED SHEETS TO A PRINTING REGION

[75] Inventor: Masato Yanagida, Tokyo, Japan

[73] Assignee: Ricoh Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/888,702

[22] Filed: Jul. 7, 1997

Related U.S. Application Data

[63] Continuation of application No. 08/451,987, May 26, 1995, abandoned.

[30] Foreign Application Priority Data

May 30, 1994 [JP] Japan .................................. 6-116270

[51] Int. Cl.[7] .................................................. G06F 15/00
[52] U.S. Cl. ........................................ 358/1.15; 358/1.18
[58] Field of Search .................................. 395/101, 104, 395/106, 109, 111, 112, 113, 114, 117; 355/1, 401, 402, 407, 408, 23, 24, 27, 40, 61, 84, 114; 399/26, 1, 2, 68, 72, 151, 152, 215; 358/400, 401, 448, 471, 472, 474, 498, 501, 505, 530, 540

[56] References Cited

U.S. PATENT DOCUMENTS

| | | | |
|---|---|---|---|
| 5,038,169 | 8/1991 | Marincic et al. | 399/124 |
| 5,126,783 | 6/1992 | Kuzuya et al. | 355/403 |
| 5,148,293 | 9/1992 | Miyachi | 358/444 |
| 5,309,245 | 5/1994 | Hayashi et al. | 358/296 |
| 5,465,160 | 11/1995 | Kamo et al. | 358/401 |
| 5,488,454 | 1/1996 | Fukada et al. | 399/1 |
| 5,511,150 | 4/1996 | Beaudet et al. | 395/113 |
| 5,597,311 | 1/1997 | Yanagida et al. | 434/358 |

*Primary Examiner*—Dov Popovici
*Assistant Examiner*—Gabriel I. Garcia
*Attorney, Agent, or Firm*—Oblon, Spivak, McClelland, Maier & Neustadt, P.C.

[57] ABSTRACT

In an image processing device, an image scanner reads a document located at a reading position and generates first image data representative of the document. The first image data are once written to an image memory. A printer prints out the first image data on a paper brought to an outputting position. A conveyor conveys the document, ready by the scanner, from the reading position to the outputting position. An image processing unit outputs, based on the first image data, second image data necessary for an image to be formed on the document brought to the outputting position.

18 Claims, 13 Drawing Sheets

IMAGE PROCESSING DEVICE WHICH TRANSFERS SCANNED SHEETS TO A PRINTING REGION

This is a Continuation of application Ser. No. 08/451,987 filed on May 26, 1995 abn.

BACKGROUND OF THE INVENTION

The present invention relates to an image processing device capable of reading the image of a document, and then printing a different image on the document. With this kind of device, any person can, for example, mark any kind of examination paper easily and output marks on the paper.

Generally, a digital copier or similar image processing device includes reading means for reading a document located at a preselected reading position, storing means for storing image data generated by the reading means, and outputting means for outputting the image data on a paper brought to a preselected outputting position. This conventional image processing device mainly concentrates on the function of transferring an image representative of the document to the paper. Specifically, a function of reading a document and then printing an extra image on the document has not been available with an image processing device of the type described.

In education facilities including schools and private schools, tests are frequently given for the purpose of confirming the students' or learners' degrees of progress, qualifying them, or determining enrollment. Traditionally, examination papers have been marked by examiners or teachers by hand. In the event of examinations for entrance and qualification as well as large-scale trial examinations, papers are marked by a number of persons or by an automatic marking system using a computer.

However, marking examination papers by hand is time- and labor-consuming and, moreover, likely to result in erroneous marks. For the automatic marking system, use is often made of mark sheets for allowing examinees to answer questions by a predetermined method, e.g., by filling answer frames printed on the sheets. Mark sheets, however, limit the answering method to extremely simple one. In addition, an exclusive device for marking mark sheets is needed which is capable of reading and marking a great number of mark sheets in a short period of time. This kind of device needs a large capacity memory and is extremely expensive. Further, the device is not feasible for the individual school or private school because it is large scale and must be operated by an experienced person. The device, lacking capabilities other than the capability of reading mark sheets, must be purchased as an exclusive device, obstructing down-sizing. Moreover, because the device does not enter marks on examination papers, it is impossible to return marked papers to examinees for future study or to report the per-question marks to examinees.

There has recently bee developed an automatic marking and totalizing system capable of directly marking any kind of examination papers, including mark sheets, and implemented as a device for personal use. Specifically, a teacher, for example, sets an examination paper at a preselected position on a table, and marks each answer with a circle, cross and so forth by using a red pen or the like, as in the traditional manual marking scheme. Then, the device reads them automatically, calculates total marks, writes the resulting data in a database, and thereby prepares an individual result list while producing the ratio of correct answers or the average marks on a question basis.

However, even the above automatic system does not contribute to labor-saving to a noticeable degree for the following reasons. Circles, crosses and other symbols for marking must be entered on papers by hand. Total marks must be transferred to a paper while it is displayed on a display.

SUMMARY OF THE INVENTION

It is, therefore, an object of the present invention to provide an image processing device capable of reading the image of a document, and then printing a different image on the document, e.g., capable of allowing any person to mark any kind of examination paper easily and printing the resulting marks on the paper.

An image processing device of the present invention has a reading section for reading the image of a document located at a predetermined reading position to thereby generate first image data, a storage for storing the first image data, an outputting section for outputting the first image data on a paper located at a predetermined outputting position to thereby form an image, a conveying mechanism for conveying the document from the reading position to the outputting position, and a processing unit for outputting, based on the first image data, second image data necessary for an image to be formed on the document brought to the outputting position.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
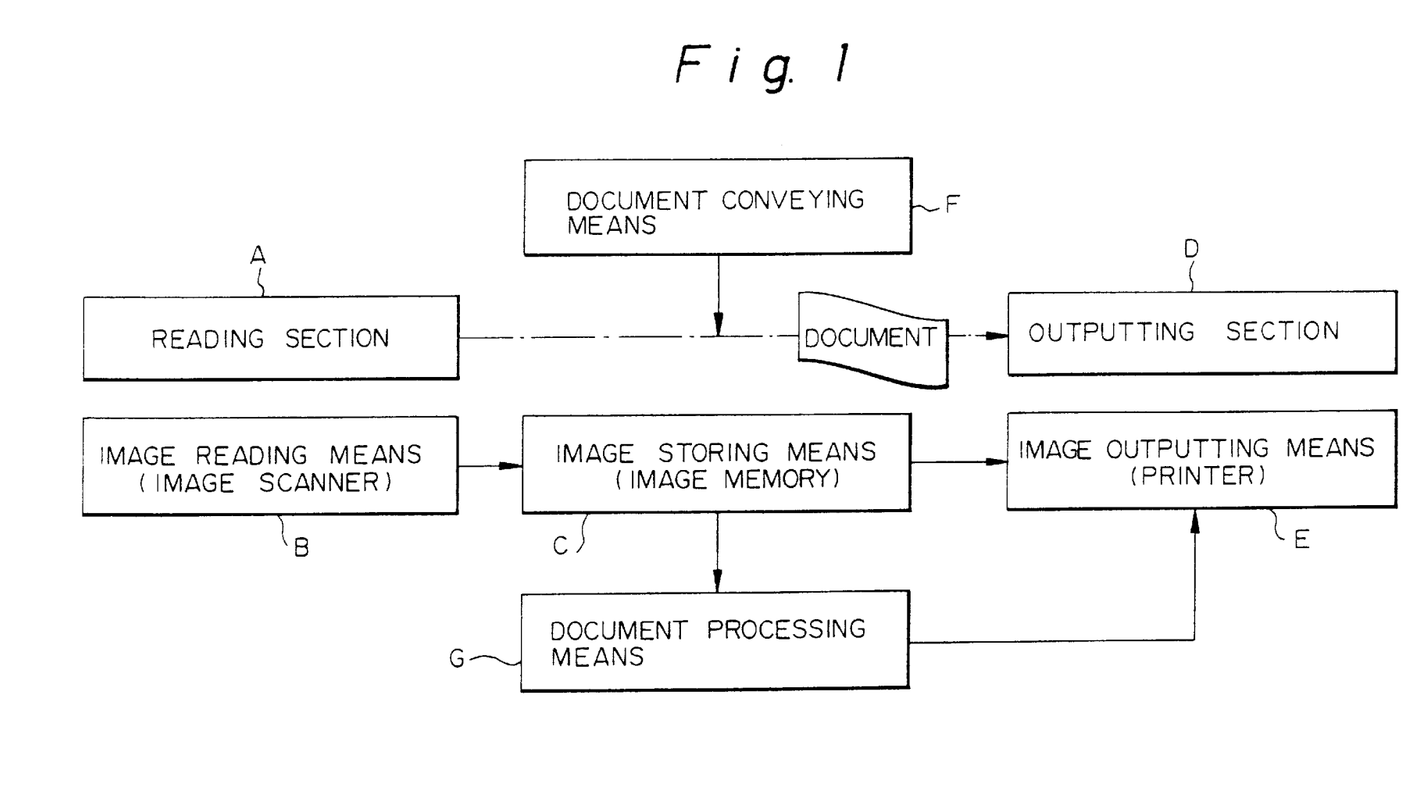
FIG. 1 is a block diagram schematically showing the basic construction of an image processing device in accordance with the present invention.

Referring to FIG. 1 of the drawings, the basic construction of an image processing device in accordance with the present invention is shown and usable as an automatic marking device. As shown, the device has an image scanner or image reading means B for reading a document located at a preselected reading section A. An image memory or image storing means C stores image data generated by the scanner B. A printer or image outputting means E outputs an image on a paper located at a preselected outputting section D. Document conveying means F conveys the document from the reading section A to the outputting section D. Document processing means G forms an image on the document at the outputting section D on the basis of the image data generated by the scanner B.

Figure 2:
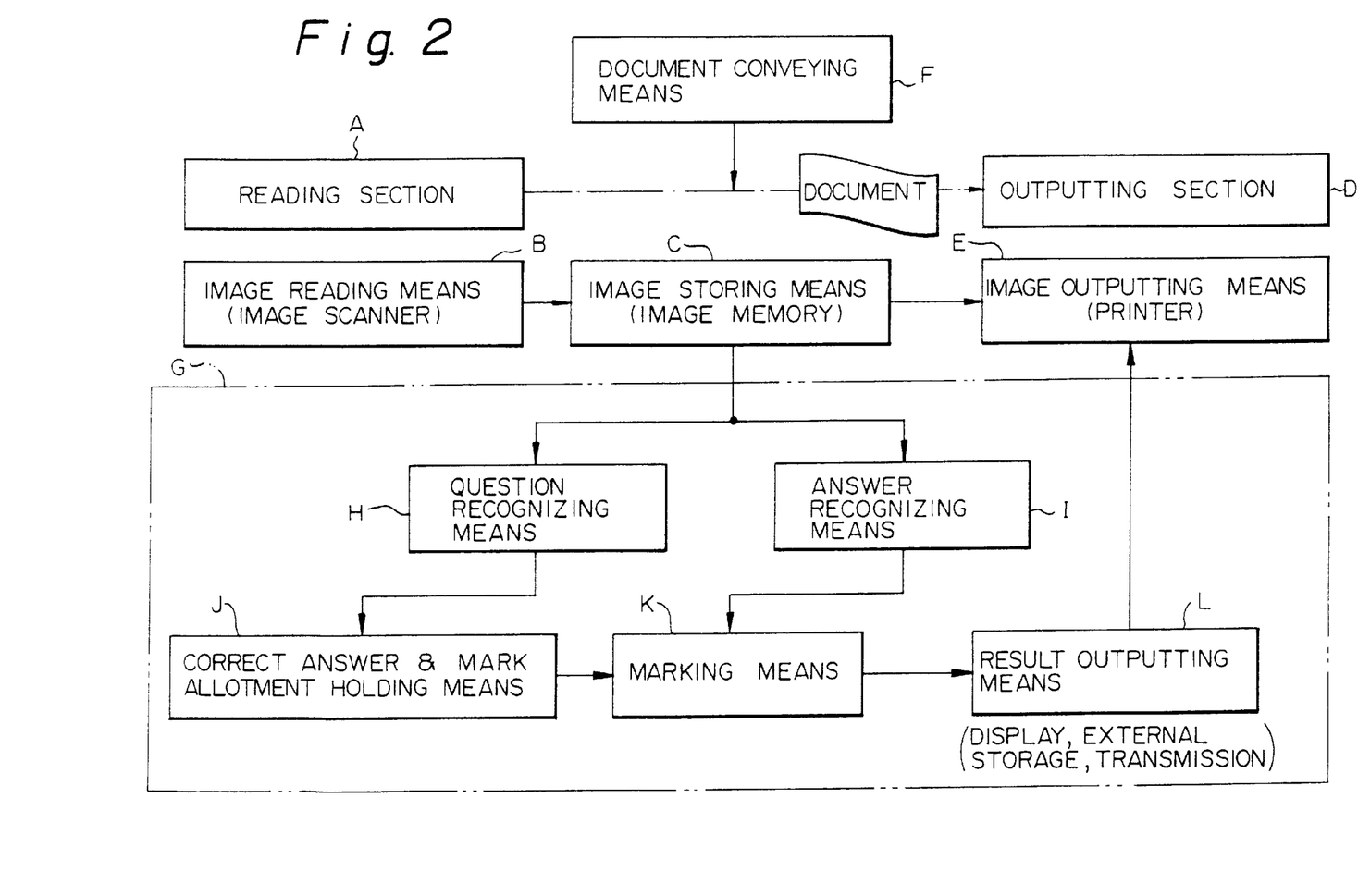
FIGS. 2 and 3 are block diagrams each schematically showing a specific construction of image processing means included in the construction of FIG. 1.

To use the device as an automatic marking device, the processing means G may be constructed as shown in FIG. 2. As shown, the processing means G has means H for recognizing questions existing on the document out of the image data generated by the scanner B. Means I identifies, also out of the image data generated by the scanner B, characters, symbols or marks representative of answers to the questions. Means J allows data representative of correct answers to the questions and the allotment of marks to be entered or stores them beforehand. Means K compares the answers and correct answers question by question to determine whether or not the answers are correct, and then calculate marks by referencing the marks allotment. Means L outputs the result of marking via the printer E.

Figure 3:
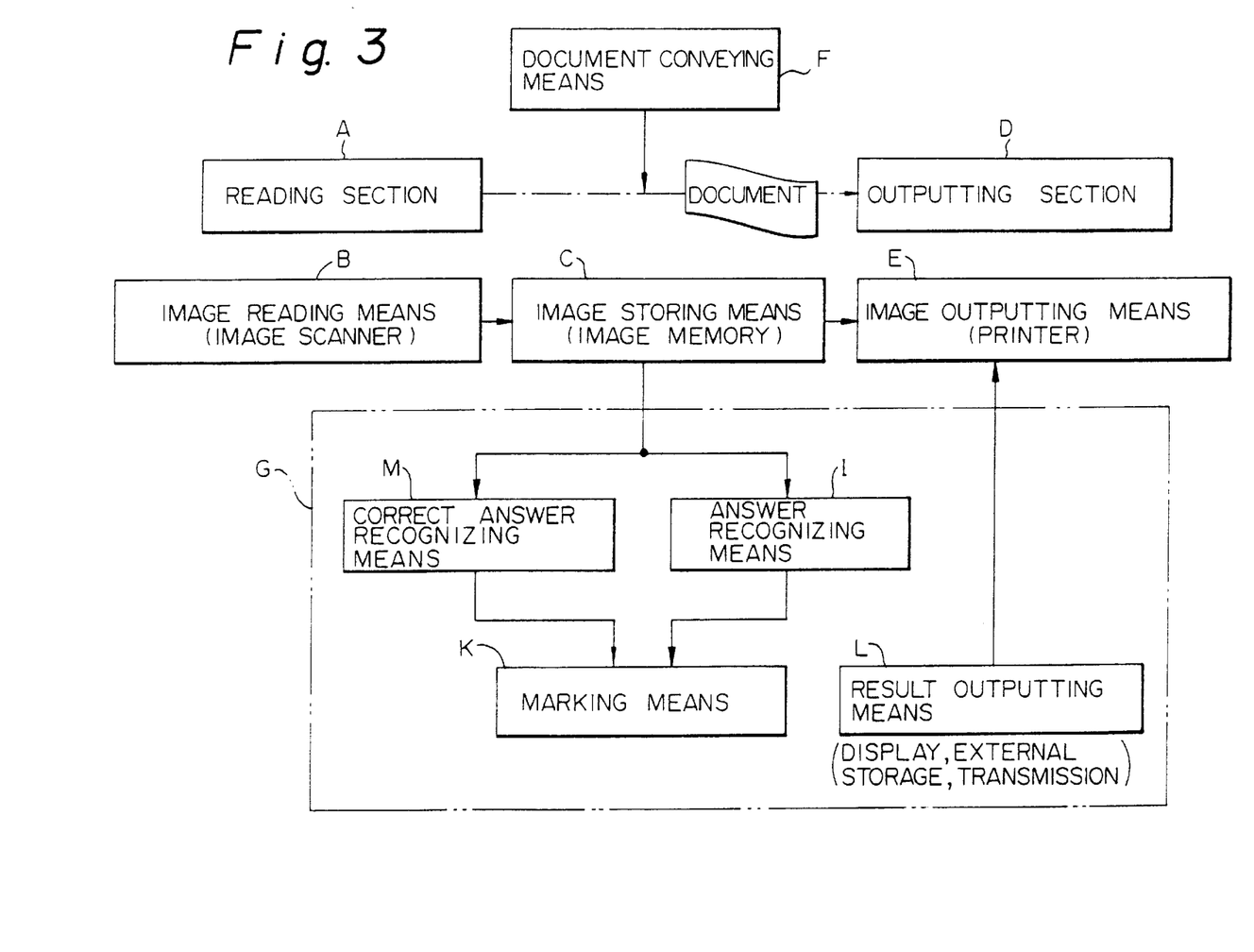

FIG. 3 shows an alternative configuration of the processing means G. Again, the processing means I recognizes characters, symbols or marks representative of the answers to the questions. Means M identifies, out of the image data, at least a bar code or similar coded data representative of the correct answers to the questions. The means K, therefore, compares the answers and the correct answers recognized by the means M. Means L outputs the result of marking produced by the means K.

In any of the above configurations, means for turning over the document at the outputting section D may be additionally provided, if desired.

In the illustrative embodiment, after an ordinary copy document has been positioned at the reading section A, the scanner B reads it. The resulting image data are once written to the image memory C and then output on a paper at the outputting section D. Hence, the device is capable of producing a desired number of copies in the same manner as a conventional digital copier.

The document conveying means F is capable of conveying the document, read by the scanner B, from the reading section A to the outputting section D. Hence, necessary image data can be output on the document by the processing means G via the printer E. This broadens the applicable range of the device. For example, when an examination paper is read by the scanner B at the reading section A, questions and answers, implemented as characters, symbols or marks, are recognized out of the resulting image data. The answers are compared with correct answers entered or stored in the means J question by question. Marks are calculated on the basis of the results of decisions and the mark allotment and then output on the document. As a result, the paper is automatically marked only if it is set at the reading section A, and in addition the marks are directly output on the same paper.

When the means M capable of decoding a bar code or similar coded data is used, it is not necessary for the device to identify questions. That is, only if coded data representative of correct answers are printed on an examination paper and respectively matched to the frames of an answer column, the device is capable of marking any kind of examination paper immediately and outputting marks on the paper.

Figure 4:
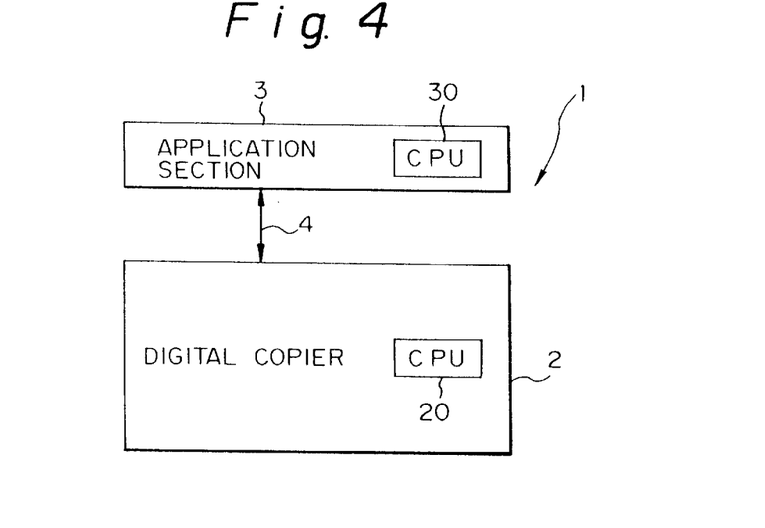
FIG. 4 is a block diagram schematically showing the general construction of an embodiment of the present invention.

A reference will be made to FIGS. 4–15 for describing the embodiment in detail. As shown in FIG. 4, the image processing device, generally 1, is implemented by a digital copier 2 and an application section 3 connected to the copier 2 by a cable 4. The application section 2 implements the marking operation particular to the present invention. Commands and image data are interchanged between the copier 2 and the section 3 over the cable 4. CPUs (Central Processing Units) 20 and 30 are respectively included in the copier 2 and section 3, and each is implemented by a microcomputer.

Figure 5:
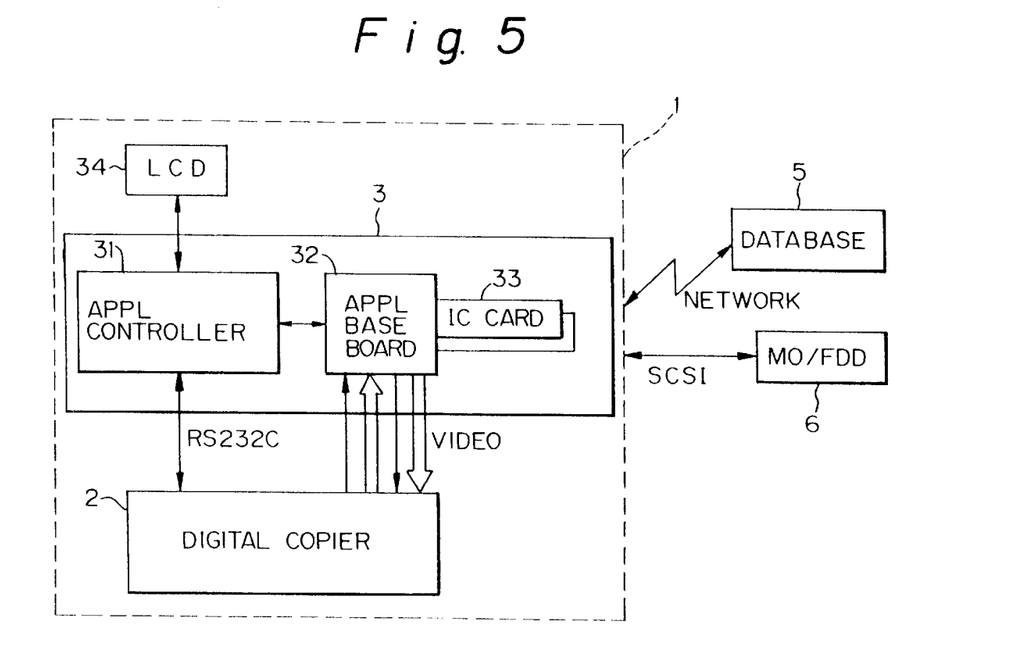
FIG. 5 is a block diagram schematically showing the embodiment more specifically.

As shown in FIG. 5 more specifically, the application section 3 has an application (APPL) controller 31 including a CPU which is supervised by an OS (Operating System). The APPL controller 31 is connected by a bus to an APPL base board 32 executing various kinds of recognition, marking, image drawing, etc. The copier 2 and base board 32 interchange video data by use of RS232C communication commands. If desired, an application program, dictionary data, font data, question data and other extra data may be fed from an IC card 33 to the application section 3. Alternatively, such extra data may be received from a database 5 via a network. Further, use may be made of a database implemented as a magnetooptic (MO) disk drive, floppy disk drive (FDD), hard disk drive (HDD) or similar storage 6 connected by SCSI. A liquid crystal display (LCD) 34 is provided on the application section 3, although its function may be assigned to a display originally provided on the copier 2.

Figure 6:
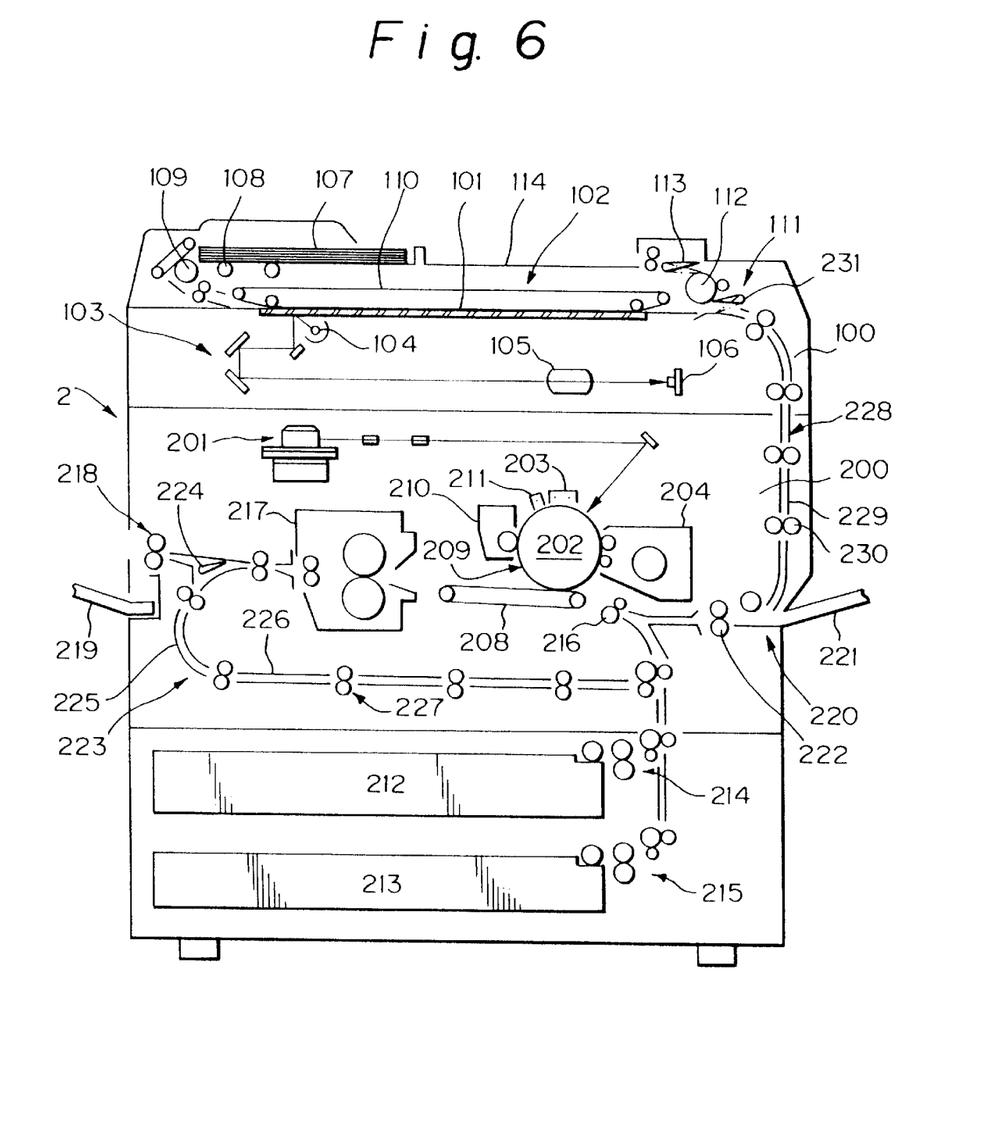
FIG. 6 is a section showing a specific construction of a digital copier shown in FIGS. 4 and 5.
Figure 7:
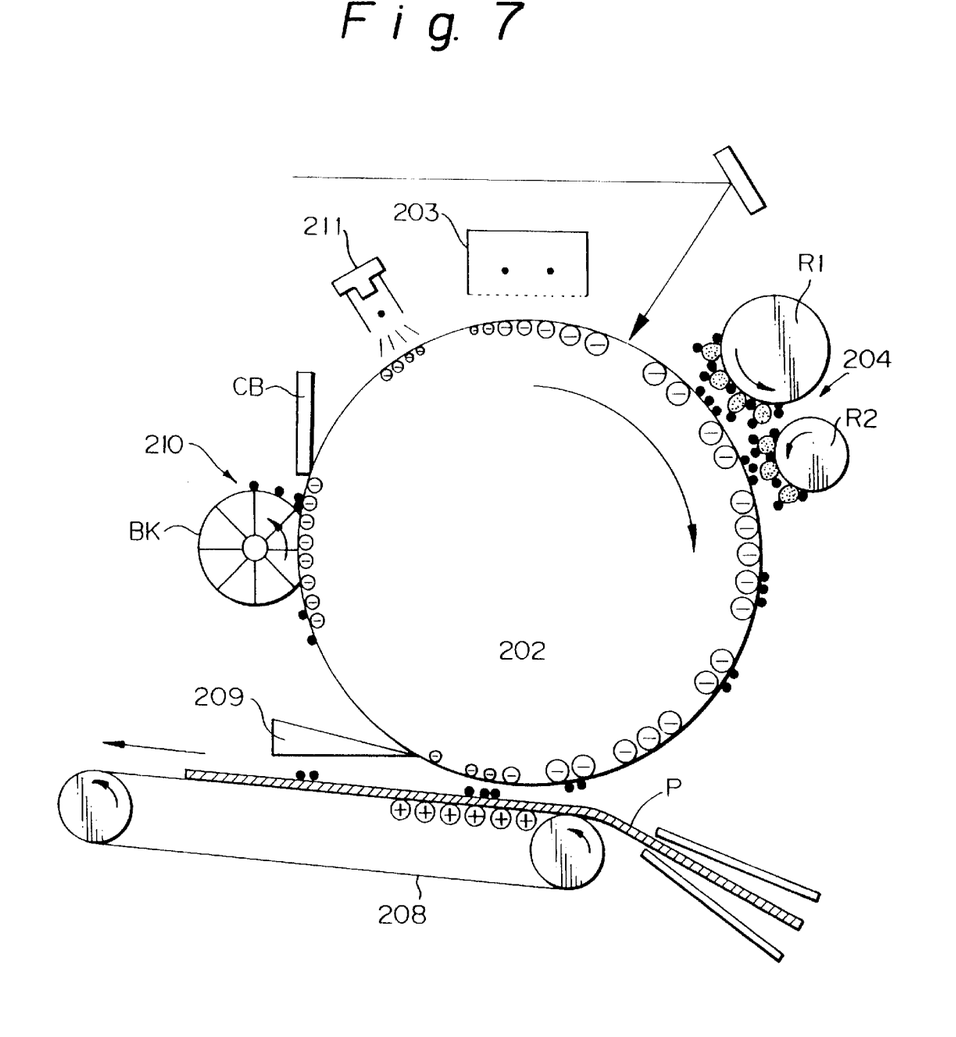
FIG. 7 shows a photoconductive element included in a printer forming part of the copier, together with units arranged around the drum.

The copier 2 is shown in FIG. 6 in detail. As shown, the copier 2 is generally made up of an image scanner or image reading means 100, and a laser printer disposed below the scanner 100 and playing the role of image outputting means. The printer 200 includes a photoconductive element in the form of a drum 202. An arrangement around the drum 202 is shown in FIG. 7 in an enlarged scale.

As shown in FIG. 6, a glass platen or image reading section 101 is mounted on the top of the scanner section 100. An ADF (Automatic Document Feeder) 102 is positioned above the glass platen 101. The ADF 102 has a tray 107 to be loaded with a stack of documents, a pick-up roller 108 for separating one of the documents from the others, a feed roller 109 for feeding the separated document toward the glass platen 101 face down, and a belt 110 for conveying the document to a predetermined position on the glass platen 101. A document turning mechanism 111 adjoins the outlet end (right end as viewed in FIG. 6) of the belt 110 in order to turn over the document automatically. The mechanism 111 has a turn roller 112 and a path selector 113. When the path selector 113 is positioned as indicated by a solid line in FIG. 6, the document caught by the turn roller 112 is again fed to between the glass platen 101 and the belt 110 from the right end, as seen in FIG. 6. When the document is a one-sided document, the path selector 113 is positioned as indicated by a phantom line in FIG. 6. In this condition, the document reached the turn roller 112 is directly driven out to a discharge table 114.

Scanning optics 103 is located below the glass platen 101 and includes a lamp 104. When the lamp 104 sequentially illuminates the underside of the document laid on the glass platen 101, the resulting imagewise reflection is incident to a monodimensional CCD (Charge Coupled Device) image sensor or photoelectric transducer 106 by way of mirrors and a lens 105. The optics 103 is driven in the right-and-left direction, as viewed in FIG. 6, by a mechanical drive line. As a result, the imagewise light is read by the image sensor 106 one line at a time. Image data generated by the image sensor 106 are once written to an image memory, which will be described, then subjected to various kinds of processing, and then converted to output image data. The output image data are delivered to a writing device 201 included in the laser printer 200.

The writing device 201 emits a laser beam modulated in accordance with the output image data. As best shown in FIG. 7, the laser beam exposes the surface of the drum 202 which is rotating in a direction indicated by an arrow in the figure. The surface of the drum 202 has been uniformly charged to a predetermined high potential by a main charger 203 beforehand. The exposed part of the drum 202 loses the charge in accordance with the intensity of the laser beam. As a result, a potential distribution matching the document image, i.e., an electrostatic latent image is formed on the drum 202. As shown in FIG. 7, a developing unit 204 has two developing rollers R1 and R2. When the latent image is brought to the developing unit 204, it is developed by a developer fed from the rollers R1 and R2 and turns out a toner image.

A plain paper is fed out from one of cassettes 212 and 213 by a group of rollers 214 or 215. A registration roller pair 216 once stops the paper and then drives it toward the drum 202 in synchronism with the toner image formed on the drum 202. A positive bias voltage is applied to a transfer belt 208 constituting an image outputting section. When the paper meets the toner image on the drum 202, the transfer belt 208 transfers the toner image, charged to the negative polarity, from the drum 202 to the paper P, FIG. 7. Subsequently, the paper P is separated from the drum 202 by a separator 209 and conveyed to a fixing unit 217 by the belt 208. The fixing unit 217 fixes the toner image on the paper by heat. Finally, the paper or copy P is driven out to a copy tray 219 by a group of outlet rollers 218. After the image transfer, the toner remaining on the drum 202 is removed by a cleaning brush BK and a cleaning blade CB constituting a cleaning unit 210. Likewise, the charge remaining on the drum 202 is dissipated by LEDs (Light Emitting Diodes) 211 effecting full-surface illumination, and a discharger effecting AC corona discharge.

A manual paper feed portion 220 includes a tray 221. A paper different in size or kind from the papers stored in the cassettes 212 and 213 may be fed from the tray 221 by hand. This paper is driven by a feed roller 222 to the registration roller pair 216 and then to the drum 202.

The printer 200 further includes a paper refeed unit 223 available for a duplex copy mode for forming an image on both sides of a paper, and for a composite copy mode. The refeed unit 223 has a path selector 224 adjoining the outlet roller group 218, a curved guide plate 225, a guide 226, and a group of refeed rollers 227. To form an image on the other side of a one-sided paper, the path selector 224 is positioned as indicated by a solid line in FIG. 6. In this position, the path selector 224 steers the paper toward the guide plate 225 immediately before it is caught by the outlet roller group 218. The guide plate 225 turns over the paper along the curvature thereof and thereby feeds it into the guide 226. As a result, the paper is again fed toward the registration roller pair 216 by the rollers 227.

In the illustrative embodiment, a document path 228 extends from part of the ADF 102 adjoining the turn roller 112 to the vicinity of the feed roller 222 of the manual feed portion 220. The document path, or document conveying means, 228 is implemented by a guide plate 229 and a plurality of roller pairs 230. The document read on the glass platen 101 is conveyed from the glass platen 101 to the drum 202 by way of the manual feed portion 220. A path selector 231 is located in the vicinity of the turn roller 112 and selectively steers the document fed from the glass platen 101 toward the turn roller 112 or toward the document path 228. One of the roller 230 in each pair is a drive roller and drives the document along the guide 229.

Figure 8:
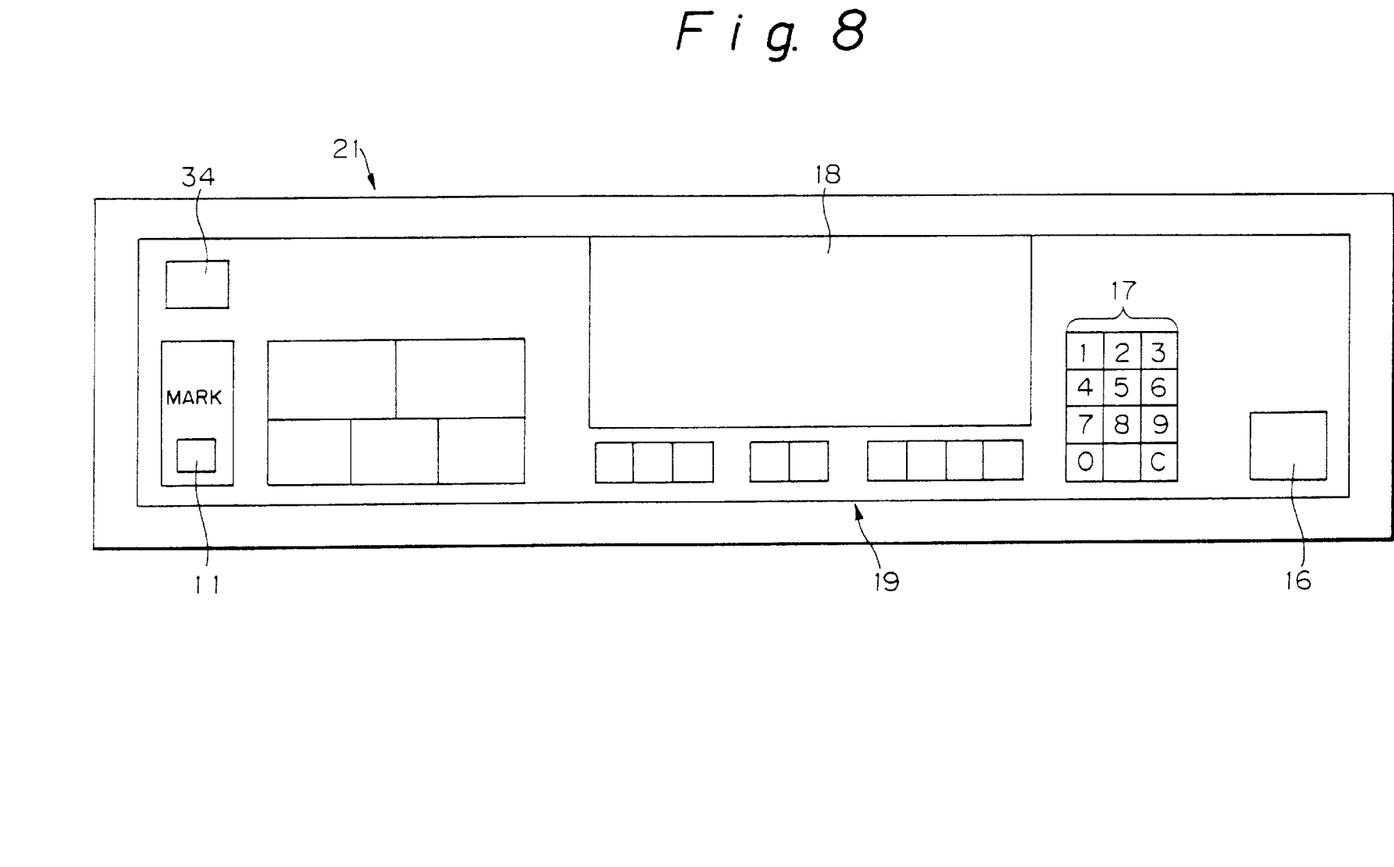
FIG. 8 is a plan view showing a specific arrangement of an operation and display panel included in the copier.

FIG. 8 shows a specific arrangement of an operation and display panel 21 mounted on the top of the copier 2. As shown, a mark key 11 is positioned at the left end of the panel 21, as viewed in the figure, and used to select a mark mode available with the application section 3, FIGS. 4 and 5. The LCD 34, also shown in FIG. 5, displays guidances and marks in the mark mode. Also arranged on the panel 21 are a start key 16, numeral keys 17, a display and input section 18 implemented by a liquid crystal tough panel, and various selection keys 19 assigned to paper size, image density, magnification, etc. These are also used in an ordinary copy mode. The selection keys 19 or the touch panel 18 is usable to implement the functions particular to the embodiment, e.g., the function of transmitting or receiving data, and the function of writing or reading data in or out of an external storage.

Figure 9:
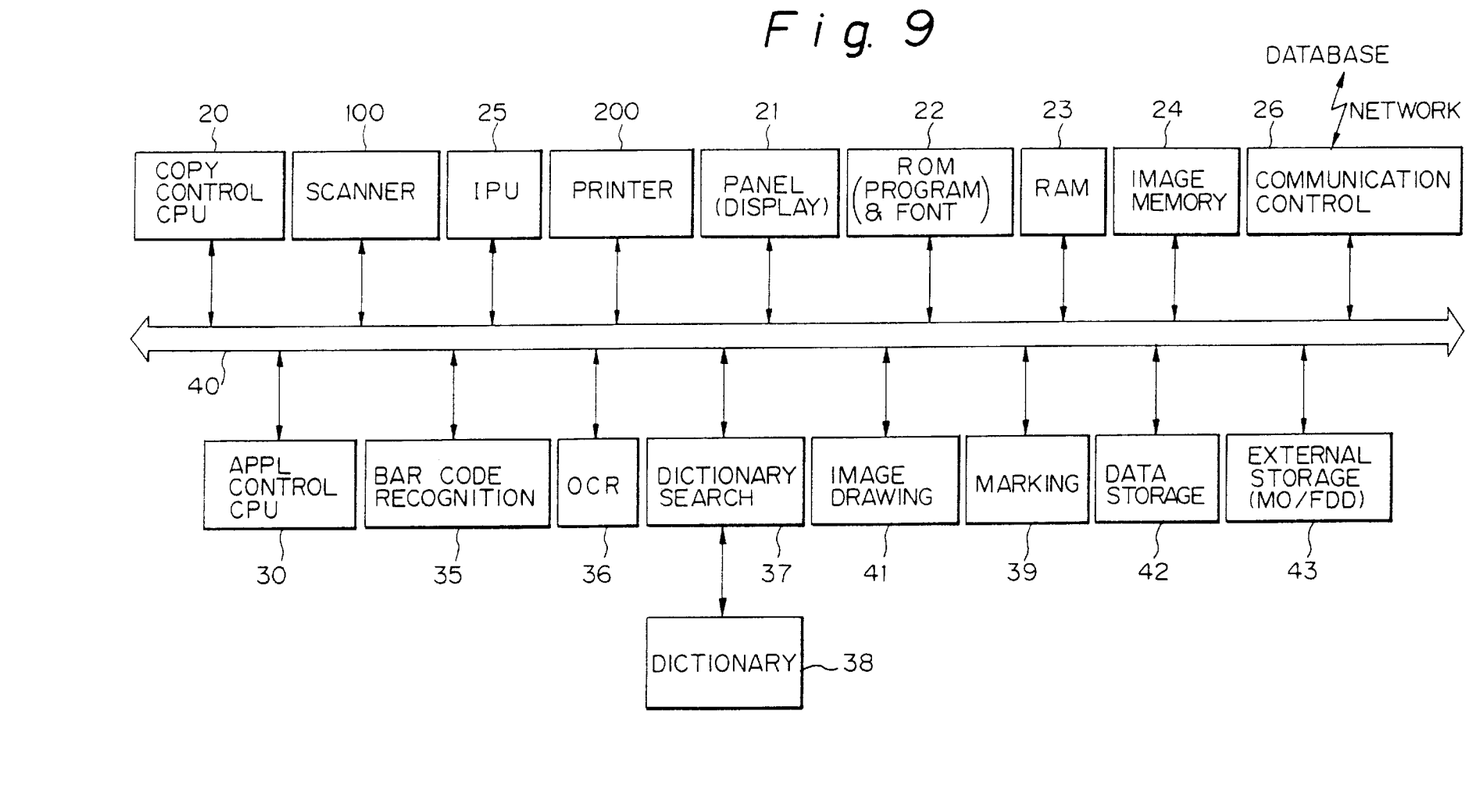
FIG. 9 is a block diagram schematically showing a data processing system and a control system available with a combination of a digital copier and an application section shown in FIG. 5.

Referring to FIG. 9, data processing and control to be executed in the device, i.e., combined copier 2 and application section 3 will be described. As shown, a CPU bus 40 connects the various constituents of the device 1 to the copier control CPU 20 and APPL control CPU 30. A ROM (Read Only Memory) 22, a RAM (Random Access Memory) 23, an image memory 24, an image processing unit (IPU) 25, a communication control unit (CCU) 26 and the previously stated scanner 100, printer 200 and panel 21 are shown above the CPU bus 40 and mainly controlled by the CPU 20. The ROM 22 stores, for example, an application program and front data to be used by the CPU 20 or 30. The RAM 23 selectively plays the role of a buffer memory for input data, a CPU work memory, or a memory for storing the result of recognition and the results of marking for a moment. The image memory 24 stores image data generated by the scanner 100 and then processed by the IPU 25. The memory 24 may be implemented by part of the RAM 23, if desired. The CCU 26 controls the interchange of data with a host computer, personal computer or similar database via a network.

A bar code recognition 35, an optical character recognition (OCR) 36, a dictionary search (37), a dictionary 38, a marking 39, an image drawing 41, a data storage 42, and an external storage 43 are shown below the CPU bus 40 and mainly controlled by the APPL control CPU 30. The bar code recognition 35 recognizes, out of the image data output from the scanner 100, a bar code representative of questions printed on an examination paper, or bar codes respectively representative of correct answers to the questions. The OCR 36 recognizes, out of the image data output from the scanner 100, various information entered on an examination paper, e.g., characters printed on the paper and representative of questions, rules also printed on the paper and representative of the frames of an answer column, and characters, symbols or marks entered by hand. The dictionary search 37 looks up the dictionary 28 to search for the information recognized by the OCR 36. The marking 39 executes processing relating to marking which is the major function of the present invention, as will be described in detail later. The image drawing 41 transforms to image data the marks and the symbols indicative of whether or not the answers are correct and including circle, crosse and triangle patterns. The image drawing 41 is also capable of transforming to image data the characters or symbols representative of correct answers, and comments. The data storage 42 is used to store question data, correct answer data, mark allotment data, comment data, marking pattern data (e.g. circle, cross, and triangle), and supervisory data. The external storage 43 causes such data to be written to an MO disk drive, FDD, HDD or similar medium removably mounted to the device 1.

To operate the device 1 in a conventional copy mode, the operator stacks documents on the tray 107 of the ADF 102, FIG. 6, then enters a desired number of copies on the numeral keys 17 (this is needless when the number is one), and then presses the start key 16. In response, the scanner 100 reads the document and delivers the resulting image data to the IPU 25. The IPU 25 processes the data and writes the processed data in the image memory 24. The printer 200 outputs the image data on the desired number of papers. This kind of copying procedure is conventional and will not be described in detail.

A mark mode available with the embodiment will be described with reference mainly to FIG. 6. When the mark key 11 on the panel 2, FIG. 8, is pressed, the path selector 231 is positioned as indicated by the solid line in FIG. 6 by a command from the APPL control CPU 30. Examination papers to be evaluated are stacked on the tray 107 of the ADF 102 face up. When the start key 16 is pressed, one of the papers is sequentially driven by the pick-up roller 108, feed roller 109 and belt 110 to a preselected position on the glass platen 101. The paper or document is positioned on the glass platen 101 face down.

After the paper or document has been read by the scanner 100, it is conveyed by the belt 110 rightward, as viewed in FIG. 6. The path selector 231 steers the document into the document path 228. As a result, the document is conveyed by the rollers 230 to the manual feed portion 220 along the guide 229. In the portion 220, the feed roller 222 drives the document to the registration roller pair 216 as with a paper from the manual feed tray 221. The roller pair 216 conveys the document to the drum 202. After the results of marking have been printed on the document by a procedure which will be described, it is driven out to the copy tray 219 by the rollers 218.

The amount of comments on the examination paper may be too great to be printed only on the front of the paper. Then, the path selector 224 of the refeed unit 223 is positioned as indicated by the solid line in FIG. 6 by a command from the CPU 30. As a result, the paper or document is again fed toward the drum 202 by way of the refeed unit 223 while being turned over. More specifically, the guide plate 225 guides the document toward the guide 226 while turning it over along its curvature. The refeed rollers 227 drive the document toward the registration roller pair 216. As a result, an image is transferred from the drum 202 to the other side or rear of the document. Subsequently, the document carrying an image on both sides thereof is driven out to the copy tray 21 by the rollers 218. At this instant, the path selector 224 has been switched to the phantom line position of FIG. 6 by a command from the CPU 30.

Figure 10:
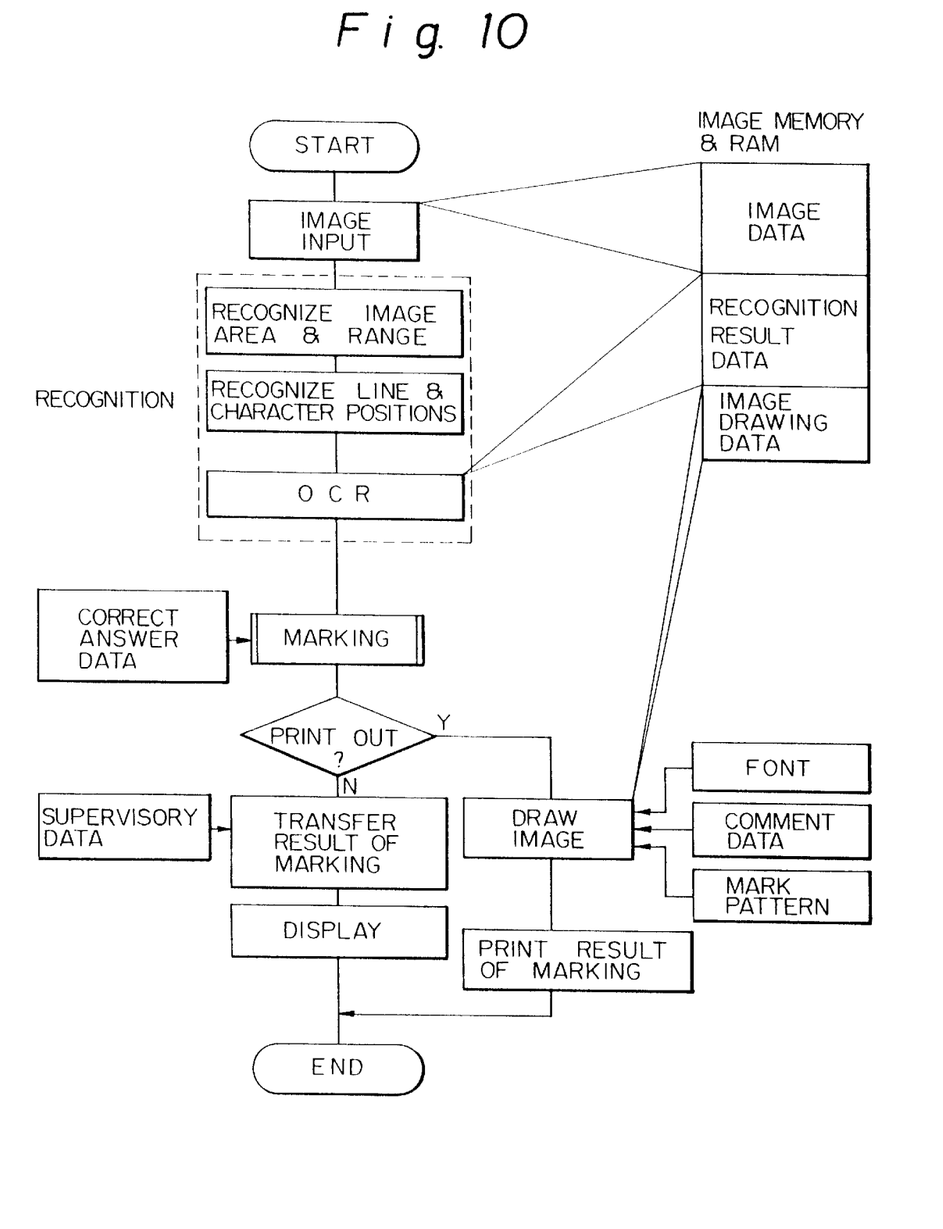
FIG. 10 is a flowchart demonstrating the operation of the application section in a mark mode.

The operation of the application section 3 in the mark mode will be described with reference to FIG. 10 as well as to other figures. FIG. 10 demonstrates the operation in relation to stored data. In the figure, image data are stored in the image memory 24; recognition result data and image drawing data are stored in the RAM 23 after recognition. Further, font data are stored in the ROM 22 beforehand. Correct answer (and mark allotment) data, comment data, marking pattern (circles, crosses and so forth) and supervisory data are stored in the data storage 42 beforehand or after recognition or generation.

First, the operator presses the mark key 11 to select the mark mode. Then, the operator stacks examination papers or documents on the ADF 102, FIG. 6, in the same manner as in the conventional copy mode, and then presses the start key 16. In response, one of the documents is brought to the glass platen 101 by the ADF 102 and positioned there face down. Image data representative of the document and generated by the scanner 100 are written to the image memory 24 by way of the IPU 25. Then, the marking routine shown in FIG. 10 begins.

The routine begins with a step of reading the image data out of the memory 24. The OCR 36 (and bar code recognition 35) executes recognition with the image data. In the illustrative embodiment, the OCR 36 identifies the image area and range of the input image data and thereby recognizes the positions of lines and characters on the lines. Let characters, symbols and marks be collectively represented by characters for simplicity. The OCR 36 recognizes characters (printed and handwritten) and rules. If an identification (ID) number is present on the document, it may be used to select, among data representative of correct answers to a great number of questions (and data representative of mark allotment) and stored in the storage 42 beforehand, the data associated with the questions of the document.

Figure 12:
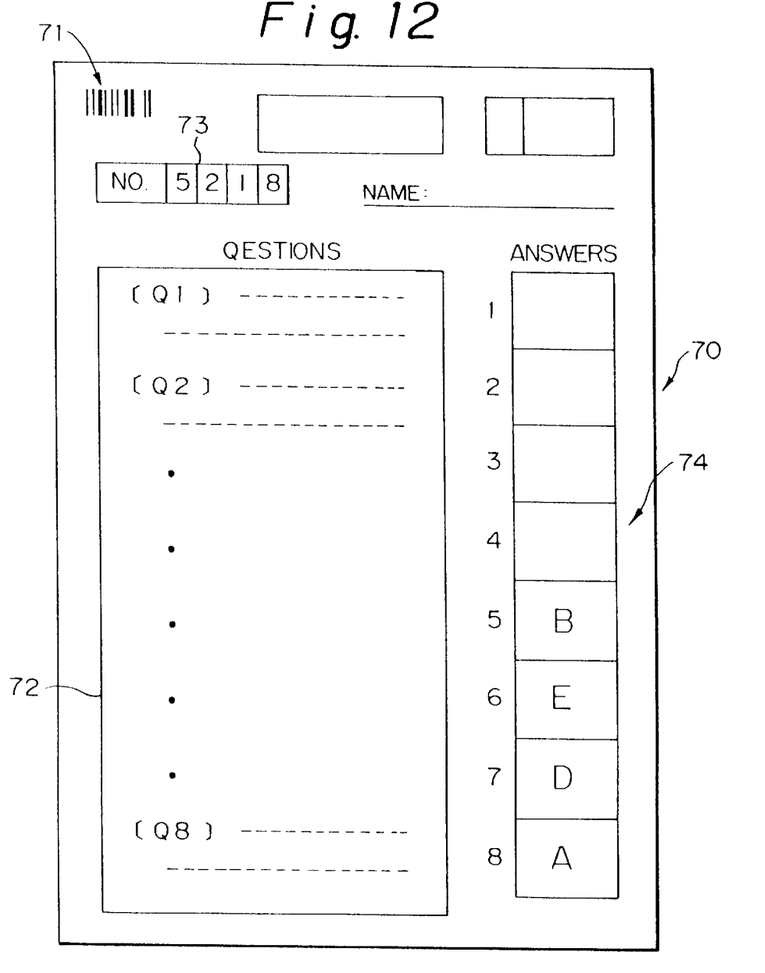
FIG. 12 shows a specific examination paper with answers and applicable to the embodiment.
Figure 13:
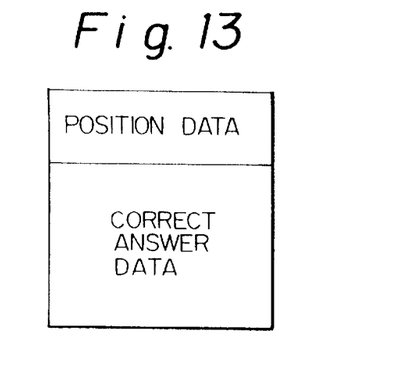
FIG. 13 shows a specific format in which correct answer data are stored and applicable to the embodiment.

FIG. 12 shows a specific examination paper 70 on which a bar code 71 is printed for the identification of questions. In this case, the bar code recognition 35 determines an ID number by identifying the bar code 71. Then, it is possible to select, among the data stored in the storage 72, the correct answer data (and mark allotment data) associated with questions (Q1–Q8) printed in a question area 72, as in the above-stated case. As shown in FIG. 13, the correct answer data consist of codes (or patterns or front) representative of characters or symbols, and position data indicative of the positions of the answers on the paper 70.

Further, the OCR processing recognizes even the examinee's number entered in a blank 73, and characters in an answer column 74 entered by hand. At the present stage of development, the recognition of handwritten characters should preferably be limited to alphanumeric characters, katakana, symbols including "+" and "−", and marks including "o" and "x" which are easy to recognize. However, future improvements in recognition technology will broaden the range of applicable characters.

Figure 11:
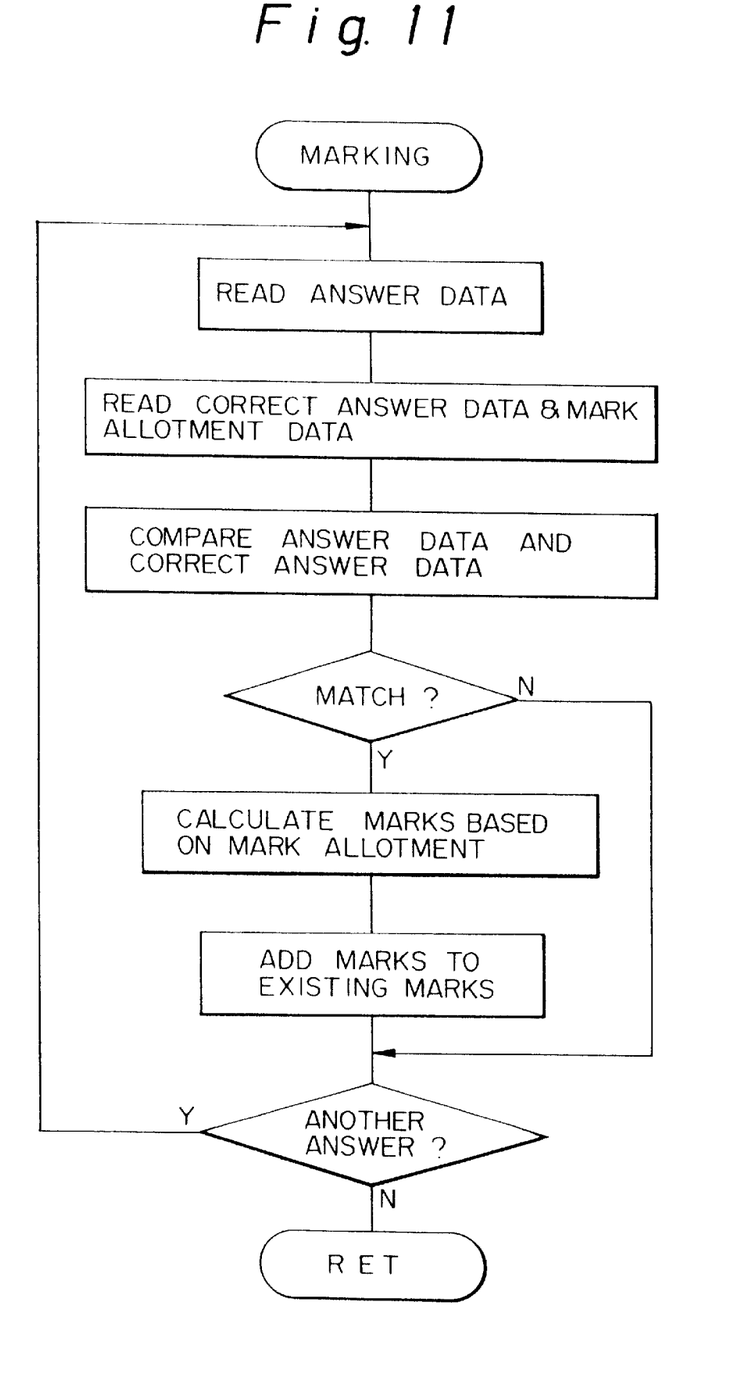
FIG. 11 is a flowchart representative of a mark subroutine to be executed in the mark mode.

The result of recognition is written to the RAM 23 in a predetermined format. The marking 39 marks the answers, included in the result of recognition, by using the correct answer data stored in the storage 42. Specifically, as shown in FIG. 11, the marking 39 reads the answer data (e.g. answer data recognized out of answer frames 1–8 shown in FIG. 12) out of the RAM 23 one by one. At the same time, the marking 39 reads the correct answer data associated with the questions and the mark allotment data out of the storage 42. Then, the marking 39 matches each answer data and the associated correct answer data and, if they are identical, calculates marks based on the mark allotment data. For example, assume that 10 marks are allocated to each of the questions Q1–Q4, FIG. 12, the marking 39 gives 10 marks to Q. 1. Such marks are sequentially added in the RAM 23. It is preferable to write the results of correct/incorrect decision in the RAM 23 together with the marks.

If the answer data is not identical with the correct answer data, the marking 39 does not calculate or store marks. It is to be noted that when the same marks are allocated to all the questions, the mark allotment data should only be read once. The marking 39, dealt with the first answer data, determines whether or not another answer data is present. If another answer data is present, the marking 39 returns to the first step shown in FIG. 11. The marking 39 repeats this procedure up to the last answer data recognized out of the examination paper 71. On completing this subroutine, the program returns to the main routine shown in FIG. 10. In FIG. 10, whether or not printing is required is determined. Because printing is usually required, the total marks data stored the RAM 23 and the results of per-answer decision, if stored in the RAM 23, are sent to the image drawing 41. If printing is not required, the results of evaluation are transferred to the storage 42 as supervisory data and displayed on the LCD 34, FIG. 8, in a predetermined format.

The image drawing 41 transforms the total marks to a numeral image by using a font stored in the ROM 22. If not only the marks but also the correct/incorrect symbols should be printed out, the image drawing 41 reads marking patterns, e.g., circles and crosses out of the storage 42 and transforms them to images while matching them to the frames of the answer column 74, FIG. 12. For incorrect answers, characters or symbols representative of correct answers and comment data may also be read out of the storage 42 and transformed to images, if desired. For this purpose, a cache memory may advantageously be used.

Figure 14:
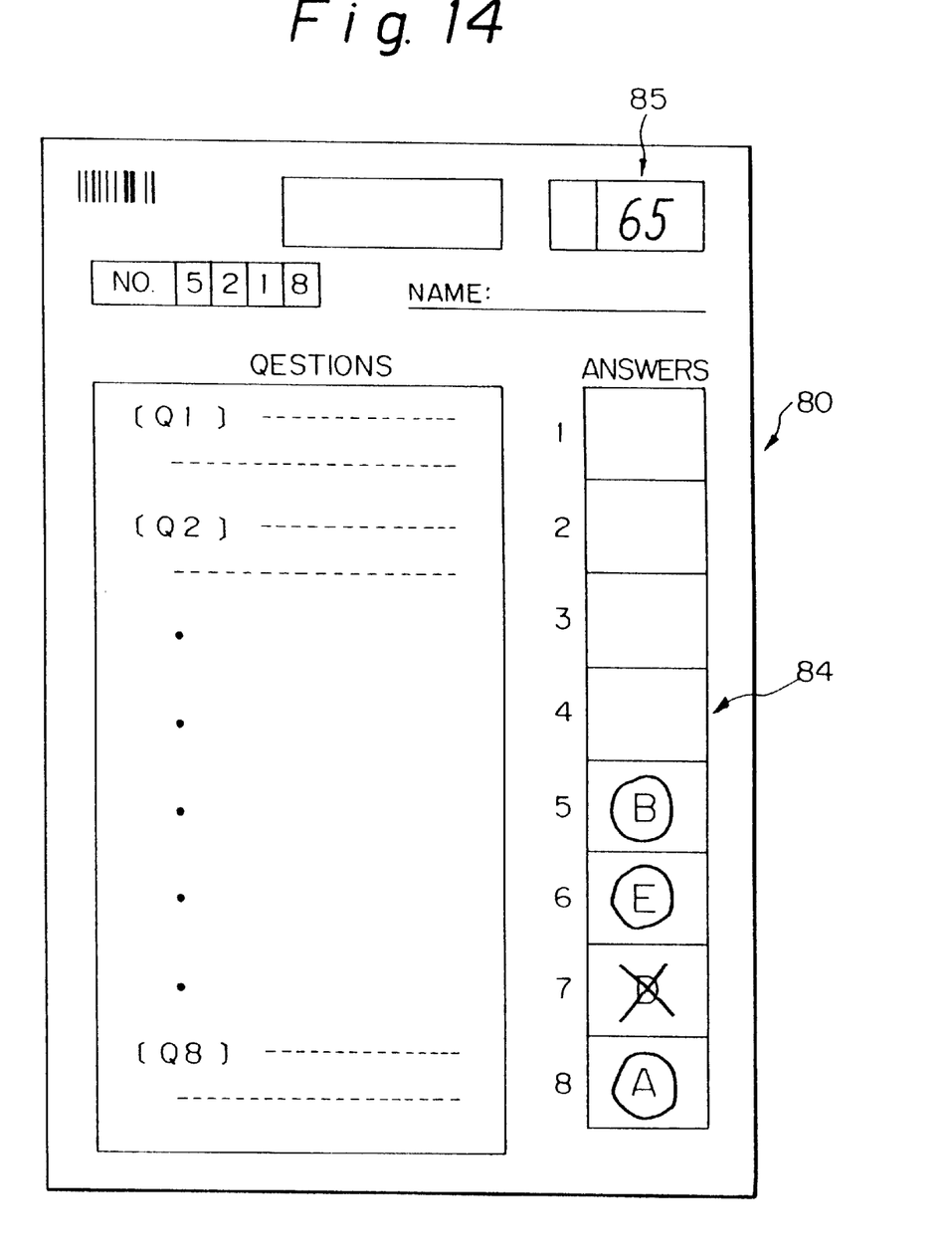
FIG. 14 shows a specific paper on which marks are printed by the embodiment.

The data generated by the image drawing 41 are printed out on the examination paper by the printer 200. FIG. 14 shows a document 80 on which specific results of evaluation are printed. As shown, the total marks are printed in a blank 85 in a pattern resembling a handwriting. Circles and crosses also resembling a handwriting are respectively printed on correct answers and incorrect answers entered in the answer column 84. The circles and crosses may be printed in red toner in order to render the results easier to understand. This kind of paper will appear as if it were evaluated by a teacher. Correct answers and comments may additionally be printed in the frames of incorrect answers in red toner. In addition, the developing unit 204, FIG. 6, may be replaced with a developing unit storing toner other than red toner so as to print the data in any desired two different colors.

Figure 15:
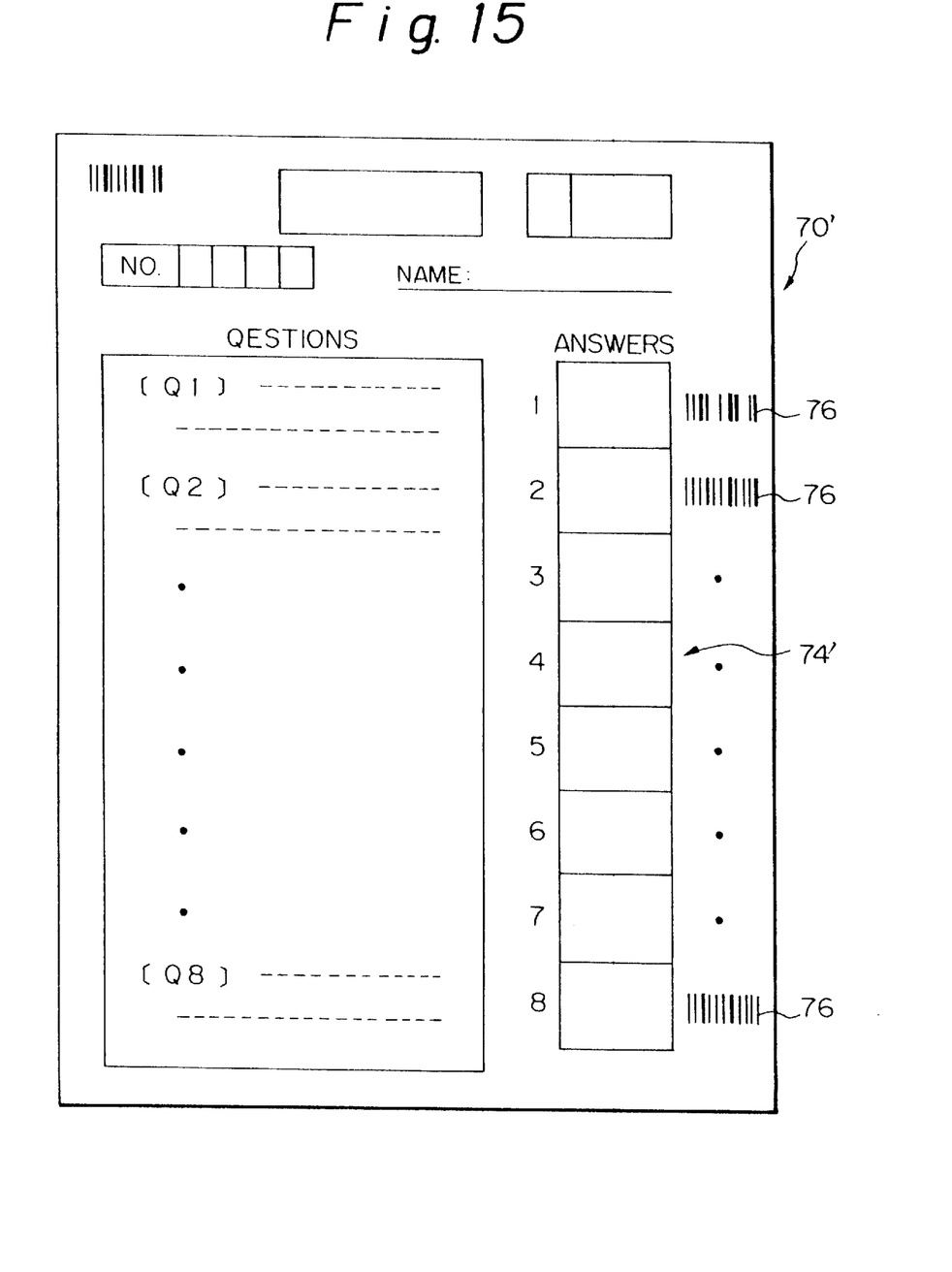
FIG. 15 shows another specific examination paper applicable to the embodiment.

FIG. 15 shows another specific examination paper 70' having an answer column 74' which is subdivided into answer frames 1–8. Bar codes 76 representative of correct answers are printed on the paper 70' in the vicinity of the respective answer frames 1–8. The positions of the bar codes 76 and the codes are sequentially recognized or decoded by the bar code recognition 35. This kind of paper 70' makes it needless to recognize questions, i.e., allows answer data to be compared with or matched to correct data immediately question by question.

In summary, it will be seen that the present invention provides an image processing device capable not only of reproducing a document like a conventional copier, but also of printing out desired image data on the document. Therefore, the device finds a broader range of applications and serves unprecedented needs. For example, only if an examination paper is set on the device, the device reads and marks it automatically and then prints the results of marking on the document. This realizes an automatic marking procedure without resorting to any additional space. In addition, the device is practicable without increasing the cost to a noticeable degree because most part of a conventional copier is usable.

Various modifications will become possible for those skilled in the art after receiving the teachings of the present disclosure without departing from the scope thereof.

What is claimed is:

1. An image processing device, comprising:
   a scanning mechanism disposed in a scanning region;
   an automatic document feeder which feeds original sheets to the scanning mechanism in order to scan the original sheets;
   a printing mechanism disposed in a printing region of the image processing device;
   a feed mechanism which feeds original sheets and receiver sheets on which information is to be printed through the printing region;
   a transfer mechanism which physically transfers original sheets from the scanning region to the printing mechanism, including:
   a transfer paper path including a plurality of driven rollers which feed original sheets from the scanning region to the printing region;
   a path selector which diverts original sheets from the scanning region to the printing region.

2. An image processing device according to claim 1, further comprising:
   a manual feed paper path which transfers original sheets and receiver sheets from a manual feed portion to the printing region,
   wherein the transfer paper path delivers original sheets from the scanning region to the manual feed paper path.

3. An image processing device according to claim 1, wherein the printing mechanism comprises:
   a photoconductive drum; and
   a light source which irradiates the photoconductive drum with light in order to form an image on the photoconductive drum.

4. An image processing device according to claim 3, wherein the printing mechanism further comprises:
   a developing mechanism for developing the image on the photoconductive drum which is to be transferred to one of the sheets.

5. An image processing device according to claim 1, wherein the scanning mechanism further comprises:
   a path selector which diverts the original sheets which have been scanned back to the scanning region in order to scan a side of the original sheets which is opposite to a side of the original sheets which has already been scanned.

6. An image processing device according to claim 1, further comprising:
   a processing device which processes information on one of the original sheets which has been obtained by scanning at the scanning region and controls a printing of information on the original sheet using the information which has been obtained by scanning.

7. An image processing device according to claim 6, wherein:
   said one of said sheets includes answers to questions;
   the image processing device includes predetermined answers to the questions; and the processing device comprises a device which determines whether the answers on said one of the original sheets correspond to the predetermined answers.

8. An image processing device according to claim 6, wherein the processing device comprises:

a character recognition device which performs an optical character recognition process on images on the original sheets which have been scanned.

9. An image processing device according to claim 8, wherein the processing device comprises:

a test grading device which compares answers from the original sheets to questions of an exam obtained by the optical character recognition process with predetermined answers to generate a comparison result and prints utilizing the printing mechanism information corresponding to the comparison result.

10. An image processing device, comprising:

a scanning means disposed in a scanning region;

an automatic document feeder means for feeding original sheets to the scanning means in order to scan the original sheets;

a printing means disposed in a printing region of the image processing device;

a feed means for feeding original sheets and receiver sheets on which information is to be printed through the printing region;

a transfer means for physically transferring original sheets from the scanning region to the printing mechanism, including:

a transfer path paper path means including a plurality of driven rollers for feeding original sheets from the scanning region to the printing region;

a path selector means for diverting original sheets from the scanning region to the printing region.

11. An image processing device according to claim 10, further comprising:

a manual feed paper path means which transfers original sheets and receiver sheets from a manual feed portion to the printing region, wherein the transfer paper path means delivers original sheets from the scanning region to the manual feed paper path means.

12. An image processing device according to claim 10, wherein the printing means comprises:

a photoconductive drum; and a light source which irradiates the photoconductive drum with light in order to form an image on the photoconductive drum.

13. An image processing device according to claim 12, wherein the printing means further comprises:

a developing means for developing the image on the photoconductive drum which is to be transferred to one of the sheets.

14. An image processing device according to claim 10, wherein the scanning means further comprises:

a path selector means for diverting the original sheets which have been scanned back to the scanning region in order to scan a side of the original sheets which is opposite to a side of the original sheets which has already been scanned.

15. An image processing device according to claim 10, further comprising:

a processing means for processing information on one of the original sheets which has been obtained by scanning at the scanning region and controls a printing of information on the original sheet using the information which has been obtained by scanning.

16. An image processing device according to claim 15, wherein:

said one of said sheets includes answers to questions;

the image processing device includes predetermined answers to the questions; and the processing means comprises means for determining whether the answers on said one of the original sheets correspond to the predetermined answers.

17. An image processing device according to claim 15, wherein the processing means comprises:

a character recognition means for performing an optical character recognition process on images on the original sheets which have been scanned.

18. An image processing device according to claim 17, wherein the processing means comprises:

a test grading means for comparing answers from the original sheets to questions of an exam obtained by the optical character recognition process with predetermined answers to generate a comparison result and prints, utilizing the printing means, information corresponding to the comparison result.

* * * * *